US007007848B2

(12) United States Patent
Li

(10) Patent No.: US 7,007,848 B2
(45) Date of Patent: Mar. 7, 2006

(54) ARRANGEMENT FOR GENERATING ASYMMETRICAL GREEN LASER BEAM

(75) Inventor: Yajun Li, Oakdale, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 104 days.

(21) Appl. No.: 10/640,431

(22) Filed: Aug. 12, 2003

(65) Prior Publication Data

US 2005/0035205 A1    Feb. 17, 2005

(51) Int. Cl.
G06K 7/10      (2006.01)

(52) U.S. Cl. .............................. 235/462.21; 235/462.2; 235/462.22; 372/20; 372/22; 372/41

(58) Field of Classification Search ........... 235/462.21, 235/462.2, 462.22; 372/41
See application file for complete search history.

(56) References Cited

U.S. PATENT DOCUMENTS

| 5,267,252 | A | * | 11/1993 | Amano .......................... 372/34 |
| 5,574,740 | A | * | 11/1996 | Hargis et al. .................. 372/41 |
| 5,593,017 | A | * | 1/1997 | Powell et al. ................ 194/212 |
| 5,712,723 | A | * | 1/1998 | Lee ............................ 359/328 |
| 6,459,493 | B1 | * | 10/2002 | Sugiura et al. ............. 356/630 |

OTHER PUBLICATIONS

Taira et al. ("Q-switching and frequency doubling of solid-state lasers by a single intracavity KTP crystal" IEEE Journal of Quantum Electronics, vol. 30, Issue 3, Mar. 1994 Page(s), 800-804).*

* cited by examiner

*Primary Examiner*—Diane I. Lee
*Assistant Examiner*—Seung H Lee
(74) *Attorney, Agent, or Firm*—Kirschstein, et al.

(57) ABSTRACT

A green laser beam is generated and is focused and shaped with an asymmetrical beam cross-section in an electro-optical reader for reading indicia. The green laser beam is also used to illuminate an aiming spot or pattern on the indicia prior to reading.

17 Claims, 3 Drawing Sheets

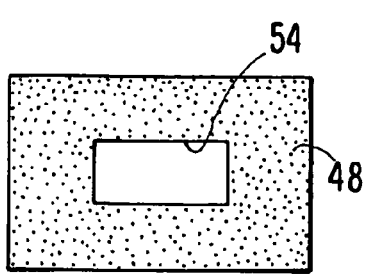
FIG. 5
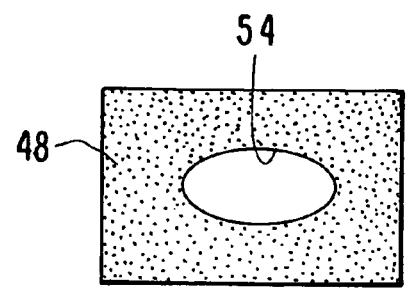
FIG. 6
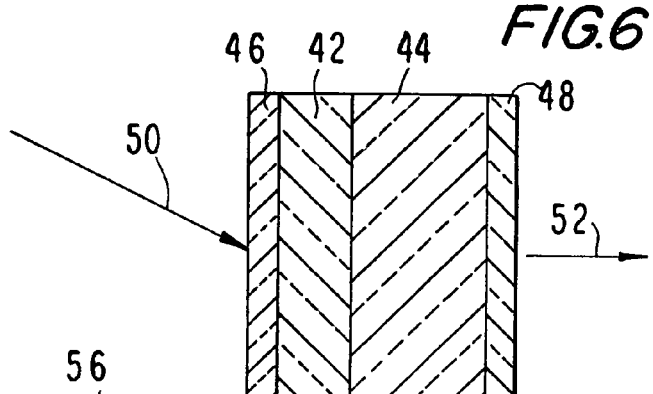
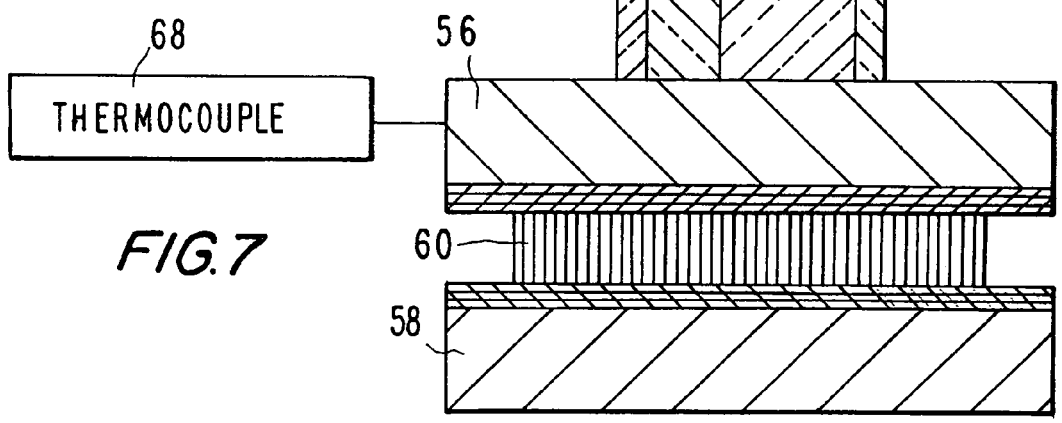
FIG. 7
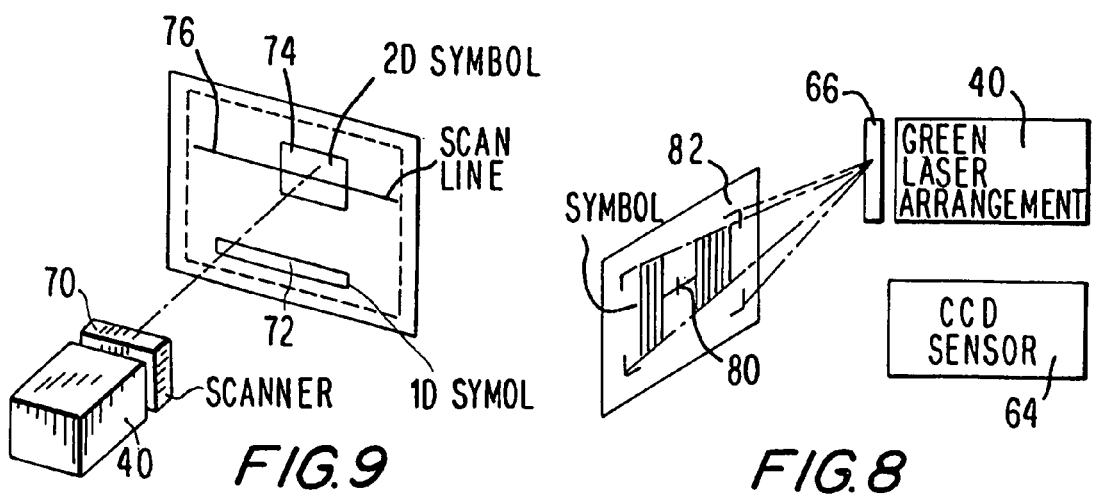
FIG. 9
FIG. 8

ARRANGEMENT FOR GENERATING ASYMMETRICAL GREEN LASER BEAM

BACKGROUND OF THE INVENTION

1. Field of the Invention

The present invention generally relates to electro-optical systems for reading indicia, for example, bar code symbols, having parts with different light reflectivities and, in particular, to an arrangement for generating a green laser beam having an asymmetrical beam cross-section, and for directing the green laser beam to a symbol for aiming and/or reading purposes.

2. Description of the Related Art

Various electro-optical readers and systems have previously been developed for reading bar code symbols appearing on a label, or on a surface of a target. The bar code symbol itself is a coded pattern of indicia. Generally, the readers electro-optically transform graphic indicia of the symbols into electrical signals which are decoded into alphanumeric characters. The resulting characters describe the target and/or some characteristic of the target with which the symbol is associated. Such characters typically comprise input data to a data processing system for applications in point-of-sale processing, inventory control, article tracking and the like.

The specific arrangement of symbol elements, e.g., bars and spaces, in a symbol defines the characters represented according to a set of rules and definitions specified by a code or symbology. The relative size of the bars and spaces is determined by the type of code used, as is the actual size of the bars and spaces.

To encode a desired sequence of characters, a collection of element arrangements is concatenated to form the complete symbol, with each character being represented by its own corresponding group of elements. In some symbologies, a unique "start" and "stop" character is used to indicate where the symbol begins and ends. A number of different bar code symbologies presently exists. The symbologies include one-dimensional codes such as UPC/EAN, Code 39, Code 128, Codabar, and Interleaved 2 of 5.

In order to increase the amount of data that can be represented or stored on a given amount of symbol surface area, several new symbologies have been developed. One new code standard, Code 49, introduced a two-dimensional concept of stacking rows of elements vertically instead of extending elements horizontally. That is, there are several rows of bar and space patterns, instead of one long row. The structure of Code 49 is described in U.S. Pat. No. 4,794,239. Another two-dimensional code structure known as PDF417 is described in U.S. Pat. No. 5,304,786.

Electro-optical readers have been disclosed, for example, in U.S. Pat. No. 4,251,798; No. 4,369,361; No. 4,387,297; No. 4,409,470, No. 4,760,248 and No. 4,896,026, all of which have been assigned to the assignee of the present invention. These readers generally include a light source consisting of a gas laser or semiconductor laser for emitting a light beam. The use of semiconductor devices as the light source in readers is especially desirable because of their small size, low cost and low power requirements. The laser beam is optically modified, typically by a focusing optical assembly, to form a beam spot having a certain size at a focal distance at which a target is located. Preferably, the cross-section of the beam spot at the focal distance approximates the minimum width between symbol regions of different light reflectivity, i.e., the bars and spaces.

In conventional readers, the light beam is directed by a scan component along a light path toward a target symbol. The reader operates by repetitively scanning the light beam in a scan pattern, for example, a line or a series of lines across the target symbol by movement of the scan component such as a mirror disposed in the path of the light beam. The scan component may sweep the beam spot across the symbol, trace a scan line across and beyond the boundaries of the symbol, and/or scan a predetermined field of view.

Readers also include a sensor or photodetector which functions to detect light reflected or scattered from the symbol. The photodetector or sensor is positioned in the reader in an optical path so that it has a field of view which extends at least across and slightly beyond the boundaries of the symbol. A portion of the light beam reflected from the symbol is detected as return light and converted into an analog electrical signal. A digitizer digitizes the analog signal. The digitized signal from the digitizer is then decoded, based upon the specific symbology used for the symbol, into a binary data representation of the data encoded in the symbol. The binary data may then be subsequently decoded into the alphanumeric characters represented by the symbol.

The laser beam in the known readers has a wavelength in a range from about 633 nm to about 670 nm, preferably the commonly used wavelength of 650 nm, and appears red to the human eye. The power and, hence, the intensity of the red laser beam is regulated by safety standards set by the International Electrotechnical Commission (IEC), in order to protect human eyes from laser exposure. Although generally satisfactory for reading bar code symbols, the visibility of the red laser beam under current safety standards is still insufficient for human eye recognition under strong sunlight or strong white light, such as fluorescent light, or for long-range scanning.

It is known to image a symbol using a two-dimensional array such as a charge coupled device (CCD) sensor. Collection optics including a focusing lens is used to focus the return light onto the CCD sensor. The image of the symbol is then detected, digitized and decoded as described above for the moving beam scanner.

It is also known to aim the CCD sensor, as well as the moving beam scanner, at the symbol prior to reading thereof. An aiming light circuit is generally used to form a static or dynamic aiming spot or pattern on the symbol. Again, if the aiming spot or pattern utilizes a red laser beam, the visibility of the aiming spot or pattern is degraded and sometimes "washed-out" under strong ambient light or long-range aiming.

SUMMARY OF THE INVENTION

OBJECTS OF THE INVENTION

One object of this invention is to increase the visibility of the light beam used for aiming and/or reading a data-encoded symbol.

Another object of this invention is to increase the depth of field of the light beam employed in moving beam readers.

Still another object of this invention is to decrease the speckle noise encountered in electro-optical readers.

Yet another object of this invention is to read symbols of higher density by reducing diffraction induced laser beam divergence.

An additional object of this invention is to reduce the psychological risk factor associated with the color red and increase the comfort level of persons viewing laser light during operation of electro-optical readers.

Another object of this invention is to provide a laser arrangement which is miniature, compact, lightweight, and durable in operation, and thus is ideally suited for portable hand-held applications.

FEATURES OF THE INVENTION

In keeping with these objects and others which will become apparent hereinafter, one feature of this invention resides, briefly stated, in an arrangement for generating and directing a light beam of high visibility toward indicia to be read in a reader for electro-optically reading the indicia, such as one-and/or two-dimensional bar code symbols.

The light beam of high visibility is generated by a laser as a green laser beam having a wavelength in a range from about 500 nm to about 550 nm, and preferably 532 nm, and directed along a path to the indicia. The laser includes an optical crystal compound having an asymmetrical cross-section as considered in a transverse plane perpendicular to the path to produce the green laser beam with an asymmetrical beam cross-section as considered in the transverse plane. In the preferred embodiment, the indicia is a one-dimensional bar code symbol having a plurality of parallel bars spaced apart of one another along a scan direction, in which case, the beam cross-section has its narrow dimension as considered along the scan direction. Moving the beam across the symbol initiates reading thereof.

Rather than, or in addition to, using the green laser beam to read the symbol, the green laser beam can also be used as an aiming light source to illuminate a static or dynamic aiming spot or pattern on the symbol prior to reading. A green beam is many times more bright than the conventional red beam for the same output power. Hence, a human operator can more readily see the green beam, even under strong outdoor light such as sunlight, or strong indoor light such as fluorescent light, or long-range reading at distances over many feet.

The green beam also exhibits a greater depth of focus as compared to a red beam. The Rayleigh range is the depth of focus of a focused Gaussian beam and is inversely proportional to wavelength. Hence, the green beam whose wavelength is shorter than the wavelength of the red beam has a greater depth of focus in which a symbol can be read.

Laser speckle are noise or interference effects caused by the coherence of the laser radiation which arise, for example, from laser illumination of a rough surface. A green laser beam has less speckle noise than a red beam due to its shorter wavelength. Higher density symbols can also be more easily read due to the shorter wavelength of the green beam which causes less diffraction induced, beam divergence.

The use of a green beam minimizes, if not eliminates, the psychological risk factor associated with the color red and danger. By contrast, the color green is more emotionally comforting because it is generally associated with nature and safety. Thus, a human operator using an electro-optical reader that emits a green beam feels more secure and, concomitantly, people in the vicinity of use of the reader, such as consumers and their children, do not feel threatened or exposed to a dangerous device, especially when the device is configured in a gun-shaped housing and resembles a weapon.

In a preferred embodiment, an output face of the crystal compound is convexly curved to provide an optical power that optically modifies and focuses the green laser beam. This can eliminate the need for a separate focusing lens in the path of the beam. Moreover, an aperture stop can be formed directly in a dielectric mirror formed on the output face of the compound. This can eliminate the need for a separate aperture stop in the path of the beam. The elimination of a discrete focusing lens and aperture stops increases the degree of miniaturization and allows the reader to have an extremely small form factor.

In summary, for laser-based data acquisition using a moving beam, the green beam is ideal for use as the moving beam, especially with the elliptical profile. For beam shaping purposes to achieve the required focal depth, additional optical power is given to the crystal compound, and the output beam is apertured. For imager-based data acquisition, the green beam can be used for aiming the imager.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is an end view of an aperture stop in accordance with the embodiment of FIG. 2;

FIG. 6 is an end view of an aperture stop in accordance with another embodiment of this invention;

FIG. 7 is a front elevational view of another embodiment of an arrangement in accordance with this invention;

FIG. 8 is a pictorial view of a green laser aiming arrangement in an imager-based reader in accordance with still another embodiment of the invention; and FIG. 9 is a perspective view of a green laser scanning arrangement in a moving beam reader for reading one-dimensional and/or two-dimensional symbols in accordance with yet another embodiment of the invention.

DETAILED DESCRIPTION OF THE PREFERRED EMBODIMENTS

Figure 1:
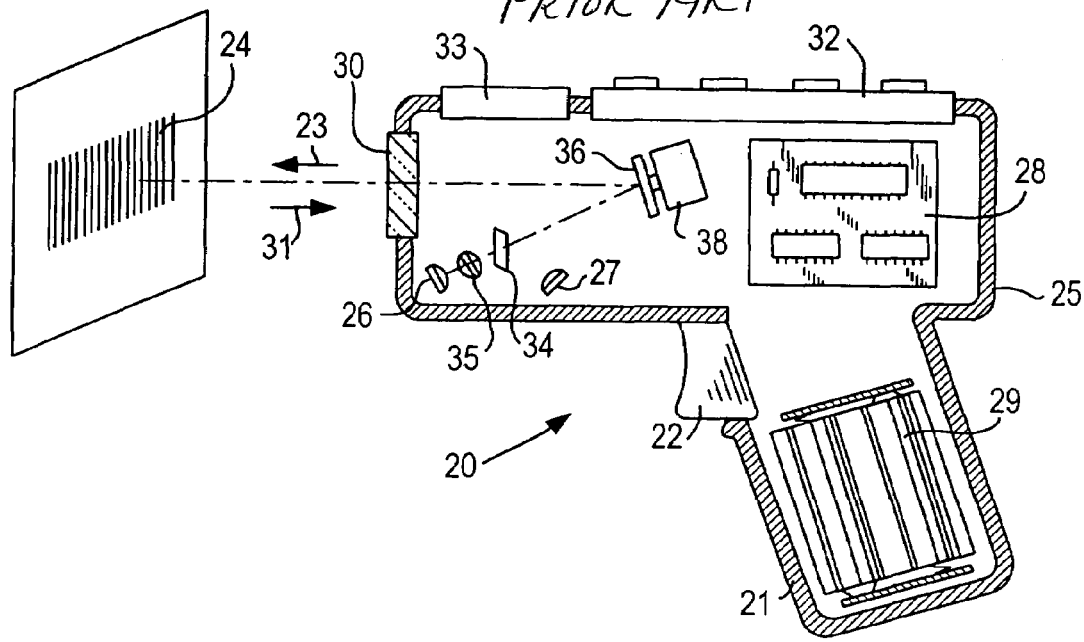
FIG. 1 is a schematic diagram of a hand-held reader for reading a bar code symbol in accordance with the prior art.

Reference numeral 20 in FIG. 1 generally identifies a hand-held reader for electro-optically reading indicia, such as bar code symbol 24, located in a range of working distances therefrom. The reader 20 has a pistol grip handle 21 and a manually actuatable trigger 22 which, when depressed, enables a light beam 23 to be directed at the symbol 24. The reader 20 includes a housing 25 in which a light source 26, a light detector 27, signal processing circuitry 28, and a battery pack 29 are accommodated. A light-transmissive window 30 at a front of the housing enables the light beam 23 to exit the housing, and allows return light 31 scattered off the symbol to enter the housing. A keyboard 32 and a display 33 may advantageously be provided on a top wall of the housing for ready access thereto.

In use, an operator holding the handle 21 aims the housing at the symbol and depresses the trigger. The light source 26 emits a light beam which is optically modified and focused by optics or focusing lens 35 to form a beam spot on the symbol 24. The beam passes through a beam splitter 34 to a scan mirror 36 which is repetitively oscillated at a scan rate of at least 20 scans a second by a motor drive 38. The scan mirror 36 reflects the beam incident thereon to the symbol 24 and sweeps the beam spot across the symbol in a scan pattern. The scan pattern can be a line extending lengthwise along the symbol along a scan direction, or a series of lines arranged along mutually orthogonal directions, or an omnidirectional pattern, just to name a few possibilities.

The reflected return light 31 has a variable intensity over the scan pattern and passes through the window 30 onto the scan mirror 36 where it is reflected onto the splitter 34 and, in turn, reflected to the photodetector 27 for conversion to an analog electrical signal. As known in the art, the signal processing circuitry 28 digitizes and decodes the signal to extract the data encoded in the symbol.

Figure 2:
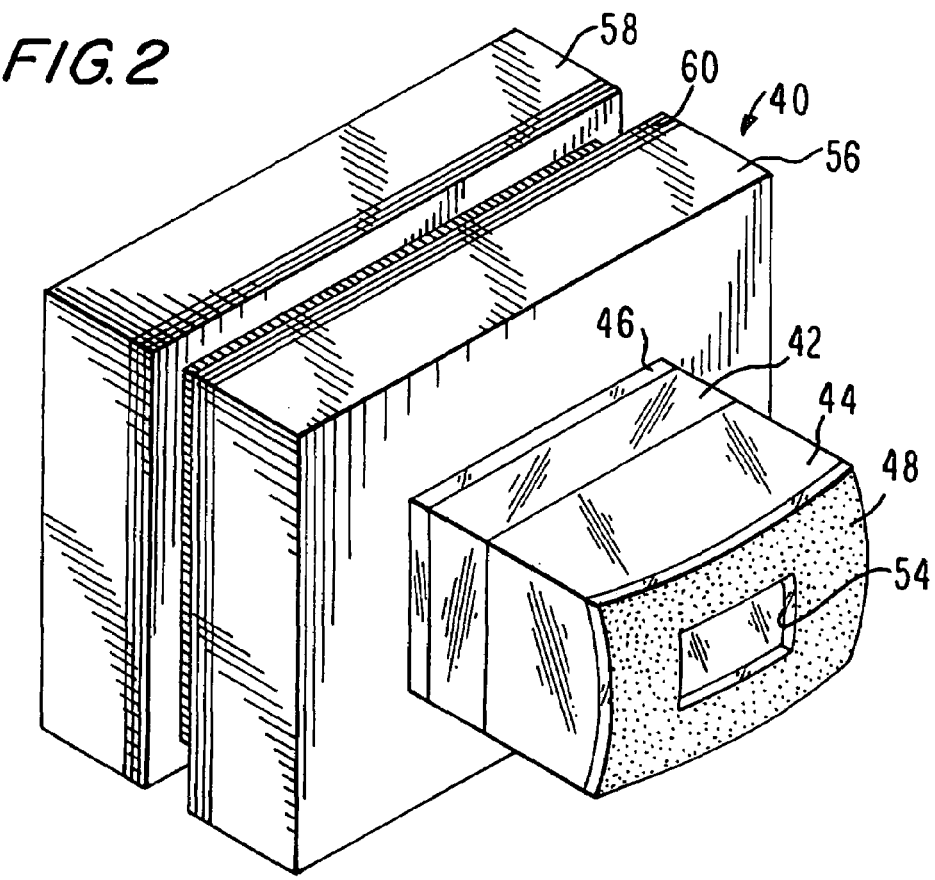
FIG. 2 is an enlarged perspective view of one embodiment of an arrangement for generating a green laser beam in accordance with this invention.
Figure 3:
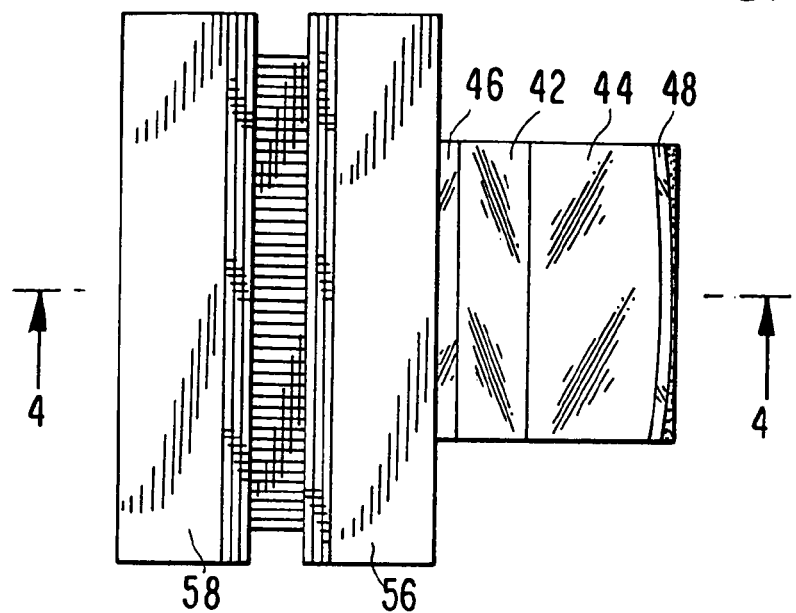
FIG. 3 is a top plan view on a reduced scale of the embodiment of FIG. 2.

The light source 26 of the prior art is a laser operative for generating the laser beam 23 at a wavelength in a range from about 633 nm to about 670 nm and with a characteristic red color which, as noted above, tends to wash out in the presence of intense ambient light, or during long-range reading. In accordance with this invention, one embodiment of a light source 40 depicted in FIG. 2 is operative for generating a green laser beam having a wavelength in a range from about 500 nm to about 550 nm, with 532 nm being the preferred wavelength.

Source 40 includes an optical crystal compound having a first non-linear optical crystal 42, a second non-linear optical crystal 44 in direct contact with the first crystal 42, an input face on which a first high reflectance dielectric mirror 46 is coated, and an output face on which a second high reflectance dielectric mirror 48 is coated.

In the preferred embodiment, the first crystal 42 is neodymium doped yttrium orthovanadate ($Nd:YVO_4$) or neodymium doped gadolinium orthovanadate ($Nd:GdVO_4$). The second crystal is preferably potassium titanyl phosphate ($KTiOPO_4$), also known as KTP. Each mirror 46, 48 is an all-dielectric, precision coating for maximum reflectance at specific wavelengths at incident angles of 0° and 45°. First mirror 46 reflects at 532 nm and at 1064 nm. Second mirror 48 reflects at 1064 nm.

Figure 4:
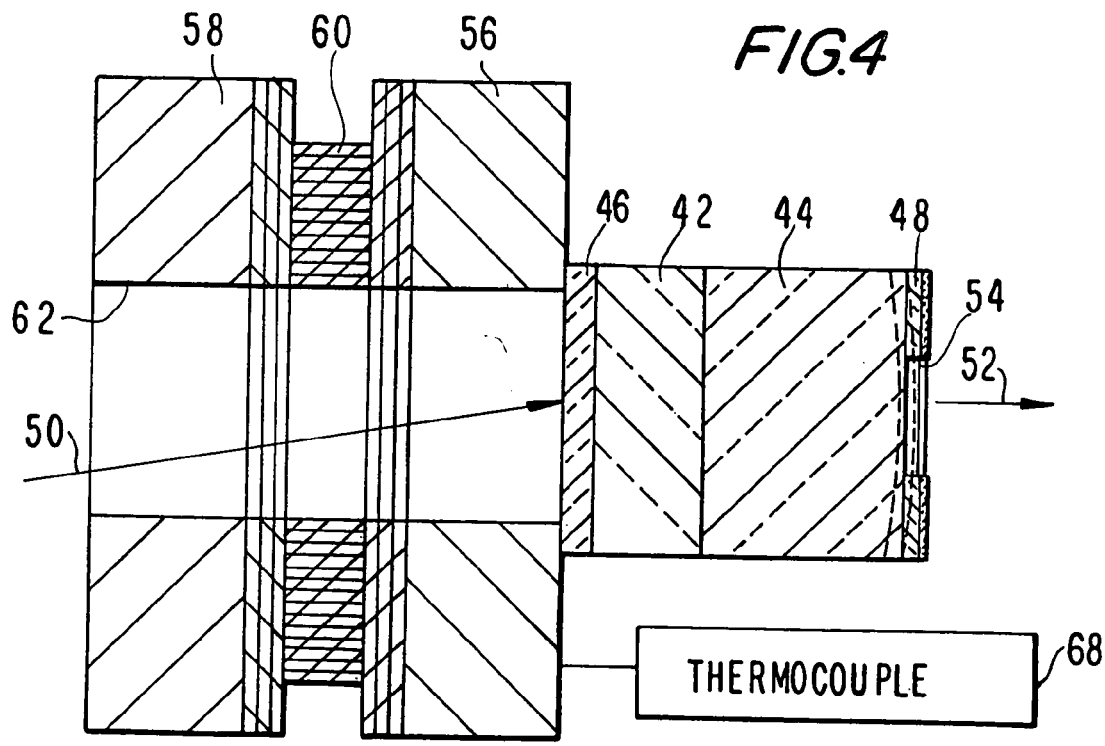
FIG. 4 is a cross-sectional view taken on line 4—4 of FIG. 3.

In both embodiments of FIGS. 4 and 7, a focused pump beam 50 impinges at an angle of 45° on the first mirror 46 and induces laser resonance within the crystal compound and the generation of second harmonics. A green laser beam 52 having a wavelength of 532 nm is radiated from the second mirror 48. The advantages of using a green laser beam with its increased visibility, increased depth of field, reduced speckle noise, reduced diffraction induced beam divergence and increased psychological comfort level were discussed above.

In the field of electro-optical readers for reading indicia such as the one-dimensional bar code symbol 24, this invention proposes shaping the green laser beam to have an asymmetrical beam cross-section as considered in a plane transverse to the direction of propagation of the beam. As shown in FIG. 2, the crystal compound has a rectangular cross-section, thereby producing an elliptical or elongated beam cross-section. In a preferred embodiment, the compound has a rectangular cross-section measuring 3.5×2 square mm. The ellipticity of the beam changes with the aspect ratio of the compound cross-section. The length of the compound is about 4 mm. The narrow dimension of the beam cross-section extends along the scan direction, that is, the direction along which the beam is swept across the indicia 24 by the scan component 36.

This invention further proposes providing optical power to the crystal compound by forming the output face with a convexly curved, spherical configuration. The output face is thus polished to form a focusing lens to focus the beam at a reference plane in the vicinity of which the symbol 24 is located. By forming a focusing lens as an integral part of the laser arrangement, the requirement for a discrete, separate focusing lens in the optics 35 is eliminated, or at least reduced.

This invention still further proposes additional beam shaping by incorporating an aperture stop as an integral part of the laser arrangement. In the prior art, an aperture stop is typically provided as a discrete element in the optical path between the laser source 26 and the scan component 36 in FIG. 1. This invention proposes forming an aperture stop 54 directly in the second mirror 48. The aperture stop 54 may have a rectangular (FIG. 5) or oval (FIG. 6) opening through which the green beam passes en route to the scan component 36.

The elimination of separate aperture stops and focusing lenses exterior to the laser provides for a very compact arrangement which can be used to install a reader in housings having a very small form factor, or as an accessory to a device in which little room is available for the addition of an electro-optical reader. For example, a miniature reader could be added to personal digital assistants or cellular telephones where available space is at a premium.

This invention yet further proposes maintaining a stable output power for the green beam in an environment from −30° C. to +60° C. Temperature control is achieved by mounting the compound on a first heat sink 56 and a second heat sink 58. An electronic cooling system, such as a Peltier element 60, is sandwiched between the sinks 56, 58. By controlling the temperature, the output wavelength can be adjusted. A thermocouple 68 is connected to the first heat sink 56 to monitor the temperature and, if the monitored temperature exceeds a threshold value, an error signal is generated in a feedback control circuit to correct the temperature and, in turn, to control the output wavelength.

In FIG. 4, the heat sinks 56, 58 and the Peltier element 60 have a clearance passage 62 through which the pump beam 50 passes with clearance to impinge on the first mirror 46.

As described so far, a focused green laser beam with an asymmetrical beam cross-section is swept across a symbol to be read. The high visibility of the green beam can also be used, prior to reading, as an aiming beam. For example, in the case of a CCD imager, as described above, and shown in FIG. 8, it is desirable to aim the CCD sensor 64 at the symbol and, for this purpose, the green laser arrangement of FIG. 2 or FIG. 7 would serve to reliably illuminate an aiming spot or pattern 80 on the symbol. FIG. 8 shows the projected aiming pattern on a target plane 82, the green laser arrangement 40 and a diffractive optical element 66 operative to produce multiple beamlets. The aiming pattern 80 comprises four corner marks and a central crosshair mark.

FIG. 9 depicts the green laser arrangement 40 and a scannner 70 operative for generating a scan line 76 across a one-dimensional bar code symbol 72 or a two-dimensional bar code symbol 74.

It will be understood that each of the elements described above, or two or more together, also may find a useful application in other types of constructions differing from the types described above.

While the invention has been illustrated and described as embodied in a green laser arrangement in electro-optical readers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In a reader for electro-optically reading indicia, an arrangement for generating and directing a light beam of high visibility toward the indicia to be electro-optically read, the arrangement comprising:

a laser for generating the light beam as a green laser beam having a wavelength in a range from about 500 nm to about 550 nm, and for directing the green laser beam along a path toward the indicia, the laser including a nonlinear optical crystal compound having an asymmetrical cross-section with unequal length and width dimensions as considered in a transverse plane perpendicular to the path to produce the green laser beam with an asymmetrical beam cross-section as considered in the transverse plane, the length dimension divided by the width dimension constituting an aspect ratio proportional to the asymmetrical beam cross-section.

2. The arrangement of claim 1, wherein the compound has opposite faces on which high reflectance dielectric mirrors are coated, and a pair of nonlinear optical crystals located between the faces to form an internal resonant structure.

3. The arrangement of claim 2, wherein one of the faces is an input face on which a pump beam is directed, and the other of the faces is an output face from which the green laser beam exits the compound, and wherein the output face is convexly curved to provide optical power that optically modifies and focuses the green laser beam.

4. The arrangement of claim 3, and an aperture stop formed in the dielectric mirror on the output face of the compound to further optically modify and focus the green laser beam.

5. The arrangement of claim 4, wherein one of the crystals is potassium titanyl phosphate, and wherein the other of the crystals is neodymium doped yttrium orthovanadate, and wherein the pump beam has a wavelength of 808 nm, and wherein the dielectric mirror on the input face has a maximum reflectance at 532 nm and at 1064 nm, and wherein the dielectric mirror on the output face has a maximum reflectance at 1064 nm.

6. The arrangement of claim 2, and a heat sink for supporting the compound in thermal communication therewith, the heat sink lying in a plane parallel to the path of the green laser beam.

7. The arrangement of claim 2, and a heat sink for supporting the compound in thermal communication therewith, the heat sink lying in a plane perpendicular to the path of the green laser beam.

8. The arrangement of claim 7, wherein one of the faces is an input face on which a pump beam is directed, and wherein the heat sink has an opening in which the input face is at least partly exposed.

9. The arrangement of claim 1, and a heat sink in thermal communication with the compound, a thermocouple connected to the heat sink for measuring a temperature of the compound, and a cooling element operatively connected to the thermocouple and the heat sink for cooling the heat sink if the temperature exceeds a threshold.

10. The arrangement of claim 1, wherein the indicia includes a bar code symbol having a plurality of parallel bars spaced apart of one another along a scan direction, and wherein the asymmetrical beam cross-section has a narrow dimension as considered along the scan direction across the symbol; and a scan component for sweeping the beam along the scan direction across the symbol during the reading thereof.

11. The arrangement of claim 1, wherein the indicia is a coded symbol, and wherein the green laser beam illuminates a part of the symbol prior to the reading thereof.

12. In a method of electro-optically reading indicia, a method of generating and directing a light beam of high visibility toward the indicia to be electro-optically read, the method comprising the steps of:

generating the light beam as a green laser beam having a wavelength in a range from about 500 nm to about 550 nm, and directing the green laser beam along a path toward the indicia, the laser beam being generated from a nonlinear optical crystal compound having an asymmetrical with unequal length and width dimensions as considered in a transverse plane perpendicular to the path to produce the green laser beam with an asymmetrical beam cross-section as considered in the transverse plane, the length dimension divided by the width dimension constituting an aspect ratio proportional to the asymmetrical beam cross-section.

13. An arrangement for generating a light beam of high visibility, the arrangement comprising:

a laser for generating the light beam as a green laser beam having a wavelength in a range from about 500 nm to about 550 nm, the laser including a nonlinear optical crystal compound having an asymmetrical cross-section with unequal length and width dimensions as considered in a transverse plane perpendicular to the path to produce the green laser beam with an asymmetrical beam cross-section as considered in the transverse plane, the length dimension divided by the width dimension constituting an aspect ratio proportional to the asymmetrical beam cross-section.

14. The arrangement of claim 13, wherein the compound has opposite faces on which high reflectance dielectric mirrors are coated, and a pair of nonlinear optical crystals located between the faces to form an internal resonant structure.

15. The arrangement of claim 14, wherein one of the faces is an input face on which a pump beam is directed, and the other of the faces is an output face from which the green laser beam exits the compound, and wherein the output face is convexly curved to provide optical power that optically modifies and focuses the green laser beam.

16. The arrangement of claim 15, and an aperture stop formed in the dielectric mirror on the output face of the compound to further optically modify and focus the green laser beam.

17. The arrangement of claim 16, wherein one of the crystals is potassium titanyl phosphate, and wherein the other of the crystals is neodymium doped yttrium orthovanadate, and wherein the pump beam has a wavelength of 808 nm, and wherein the dielectric mirror on the input face has a maximum reflectance at 532 nm and at 1064 nm, and wherein the dielectric mirror on the output face has a maximum reflectance at 1064 nm.

* * * * *